United States Patent
Yamamoto et al.

(10) Patent No.: US 11,465,677 B2
(45) Date of Patent: Oct. 11, 2022

(54) CONTROL DEVICE FOR VEHICLE

(71) Applicant: TOYOTA JIDOSHA KABUSHIKI KAISHA, Toyota (JP)

(72) Inventors: Junro Yamamoto, Susono (JP); Yoshikazu Kameda, Gotemba (JP); Koichi Nishimura, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 606 days.

(21) Appl. No.: 16/593,011

(22) Filed: Oct. 4, 2019

(65) Prior Publication Data

US 2020/0156701 A1 May 21, 2020

(30) Foreign Application Priority Data

Nov. 21, 2018 (JP) .............................. JP2018-218305

(51) Int. Cl.
*B62D 6/00* (2006.01)
*B62D 1/04* (2006.01)
*B62D 5/04* (2006.01)
*B62D 15/02* (2006.01)

(52) U.S. Cl.
CPC ............... *B62D 6/008* (2013.01); *B62D 1/04* (2013.01); *B62D 5/0409* (2013.01); *B62D 5/0463* (2013.01); *B62D 6/006* (2013.01); *B62D 15/022* (2013.01); *B62D 15/0235* (2013.01)

(58) Field of Classification Search
None
See application file for complete search history.

(56) References Cited

U.S. PATENT DOCUMENTS

2004/0019417 A1* 1/2004 Yasui ...................... B60T 8/172
701/80
2012/0215406 A1* 8/2012 Tanimoto ............. B62D 15/025
701/41

FOREIGN PATENT DOCUMENTS

| JP | 2010-188883 A | 9/2010 |
| JP | 2010-228485 A | 10/2010 |
| JP | 2015-123866 A | 7/2015 |

\* cited by examiner

*Primary Examiner* — Adam R Mott
*Assistant Examiner* — Erick T. Detweiler
(74) *Attorney, Agent, or Firm* — Sughrue Mion, PLLC

(57) ABSTRACT

A control device for a steer-by-wire type vehicle calculates a target turn angle being represented as a function of a steering angle of a steering wheel, and controls a turning device such that a turn angle of a wheel becomes the target turn angle. A variation range of the steering angle includes: an effective steering range in which the steering angle is an effective maximum steering angle or smaller; and an adjustment steering range in which the steering angle is between the effective maximum steering angle and a predetermined maximum steering angle. The target turn angle calculated according to the effective maximum steering angle is an effective maximum turn angle. The control device variably sets the function according to a road surface condition such that the effective maximum turn angle in a case of a low-μ condition is smaller than that in a case of a high-μ condition.

9 Claims, 14 Drawing Sheets

CONTROL DEVICE FOR VEHICLE

BACKGROUND

Technical Field

The present disclosure relates to a control device for a vehicle of a steer-by-wire type.

Background Art

Patent Literature 1 discloses a vehicle behavior control device that controls vehicle behavior. The vehicle behavior control device sets a target motion state quantity such as a target yaw rate based on a steering angle, and then controls the vehicle behavior based on the target motion state quantity. Here, the vehicle behavior control device sets a limit steering angle according to a vehicle speed, and sets the target motion state quantity based on a smaller one of the limit steering angle and an actual steering angle.

Patent Literature 2 discloses a steering control device for a vehicle. The steering control device calculates a target turn angle according to a steering angle of a steering wheel. More specifically, the steering control device suppresses a change in the target turn angle with respect to a change in the steering angle in a case where a lateral acceleration is equal to or higher than a predetermined threshold than in a case where the lateral acceleration is lower than the predetermined threshold. Furthermore, the steering control device sets the predetermined threshold in a case where a road surface friction coefficient is low to be lower than that in a case where the road surface friction coefficient is high.

List of Related Art

Patent Literature 1: Japanese Unexamined Patent Application Publication No. JP-2010-228485
Patent Literature 2: Japanese Unexamined Patent Application Publication No. JP-2010-188883

SUMMARY

Let us consider a road surface condition of a road surface on which a vehicle travels. In a low-μ condition where a road surface friction coefficient is low, vehicle behavior is likely to be unstable. In particular, the vehicle behavior is likely to be unstable when a turn angle of a wheel becomes large in the low-μ condition.

An object of the present disclosure is to provide a technique that can suppress destabilization of vehicle behavior when the road surface condition is the low-μ condition.

A first aspect of the present disclosure is directed to a control device for a vehicle of a steer-by-wire type.

The vehicle includes a steering wheel and a turning device configured to turn a wheel.

The control device is configured to:
calculate a target turn angle being represented as a function of a steering angle of the steering wheel; and
control the turning device such that a turn angle of the wheel becomes the target turn angle.

A variation range of the steering angle includes:
an effective steering range in which the steering angle is equal to or smaller than an effective maximum steering angle; and
an adjustment steering range in which the steering angle is larger than the effective maximum steering angle and equal to or smaller than a predetermined maximum steering angle.

The target turn angle calculated according to the predetermined maximum steering angle is equal to a predetermined maximum turn angle.

The target turn angle calculated according to the effective maximum steering angle is an effective maximum turn angle.

a road surface condition of a road surface on which the vehicle travels includes a high-μ condition and a low-μ condition where a road surface friction coefficient is lower than that in the high-μ condition.

The control device is further configured to variably set the function according to the road surface condition such that the effective maximum turn angle in a case of the low-μ condition is smaller than the effective maximum turn angle in a case of the high-μ condition.

A second aspect further has the following feature in addition to the first aspect.

A slope of the function is a derivative of the target turn angle with respect to the steering angle.

The slope in the adjustment steering range is higher than the slope in the effective steering range.

A third aspect further has the following feature in addition to the first or second aspect.

The vehicle further includes a reaction torque generation device configured to apply a reaction torque to the steering wheel.

The control device is further configured to:
control the reaction torque generation device such that the reaction torque according to the steering angle is applied to the steering wheel; and
make the reaction torque in the adjustment steering range larger than the reaction torque in the effective steering range.

A fourth aspect further has the following feature in addition to the third aspect.

A precursor steering angle is the steering angle smaller than the effective maximum steering angle.

A reaction torque slope is a derivative of the reaction torque with respect to the steering angle.

The control device is further configured to make the reaction torque slope in a case where the steering angle is equal to or larger than the precursor steering angle higher than the reaction torque slope in a case where the steering angle is smaller than the precursor steering angle.

A fifth aspect further has the following feature in addition to any one of the first to fourth aspects.

The control device is further configured to decrease the effective maximum turn angle as a speed of the vehicle becomes higher.

A sixth aspect further has the following feature in addition to any one of the first to fifth aspects.

In the effective steering range, the target turn angle in the case of the low-μ condition is equal to or smaller than the target turn angle in the case of the high-μ condition.

A seventh aspect further has the following feature in addition to the sixth aspect.

A slope of the function is a derivative of the target turn angle with respect to the steering angle.

In the effective steering range, the slope in the case of the low-μ condition is equal to or lower than the slope in the case of the high-μ condition.

An eighth aspect further has the following feature in addition to the seventh aspect.

The effective steering range includes:
a first steering range in which the steering angle is smaller than a first steering angle; and a second steering range in which the steering angle is equal to or larger than the first steering angle and equal to or smaller than the effective maximum steering angle.

In the first steering range, the slope in the case of the low-μ condition is equal to or lower than the slope in the case of the high-μ condition.

In the second steering range, the target turn angle in the case of the low-μ condition is equal to the effective maximum turn angle.

A ninth aspect further has the following feature in addition to the eighth aspect.

The vehicle further includes a reaction torque generation device configured to apply a reaction torque to the steering wheel.

The control device is further configured to:

control the reaction torque generation device such that the reaction torque according to the steering angle is applied to the steering wheel; and make the reaction torque in the second steering range larger than the reaction torque in the first steering range.

According to the present disclosure, the control device variably sets the function between the steering angle and the target turn angle according to the road surface condition. More specifically, the control device variably sets the function according to the road surface condition such that the effective maximum turn angle in the case of the low-μ condition is smaller than the effective maximum turn angle in the case of the high-μ condition. Since the effective maximum turn angle is decreased in the case of the low-μ condition, destabilization of vehicle behavior is suppressed in the case of the low-μ condition.

EMBODIMENTS

Embodiments of the present disclosure will be described below with reference to the attached drawings.

1. Steer-by-Wire System

Figure 1:
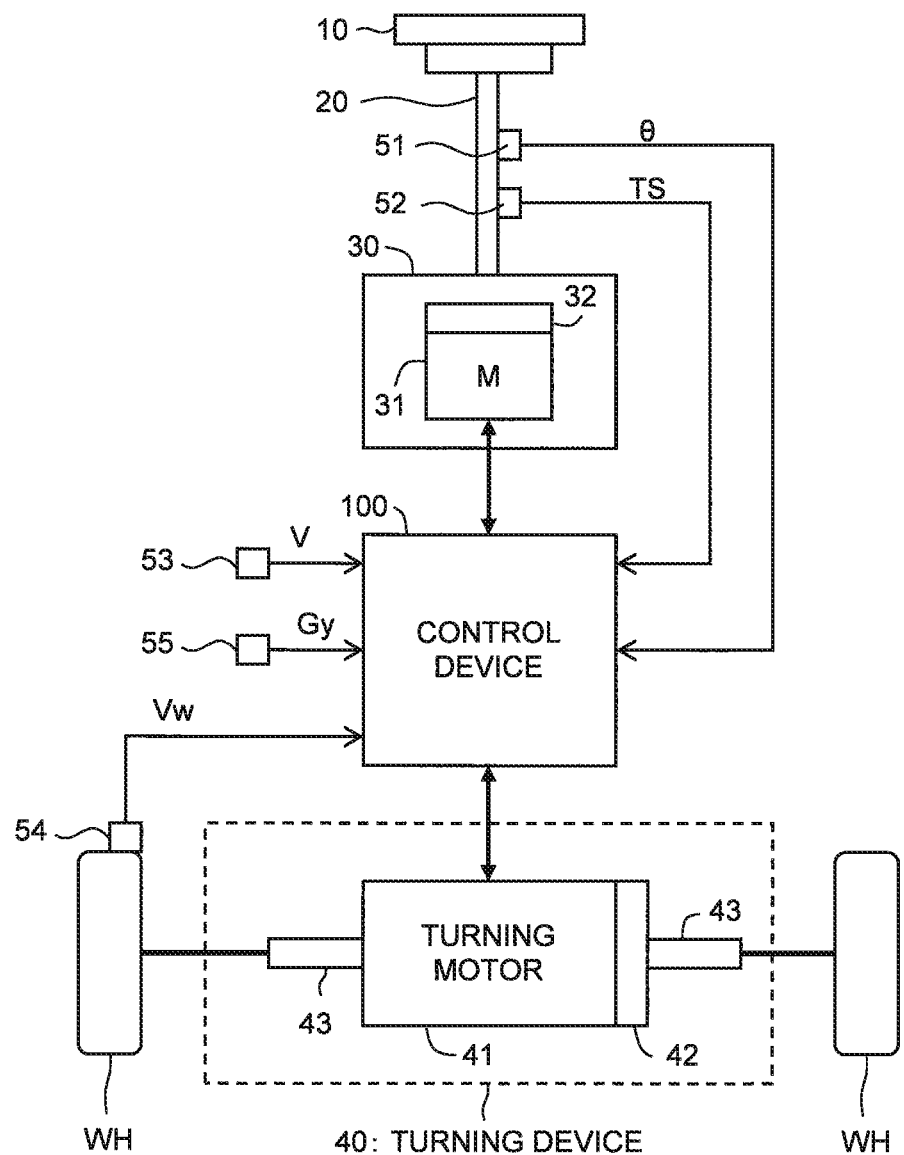
FIG. 1 is a block diagram schematically showing a configuration example of a steer-by-wire system according to an embodiment of the present disclosure.

FIG. 1 is a block diagram schematically showing a configuration example of a steer-by-wire system 1 according to the present embodiment. The steer-by-wire system 1 is installed on a vehicle and turns (i.e. changes a direction of) a wheel WH of the vehicle by a steer-by-wire manner. That is, the steer-by-wire system 1 achieves the vehicle of a steer-by-wire type.

In the example shown in FIG. 1, the steer-by-wire system 1 includes a steering wheel 10, a steering shaft 20, a reaction torque generation device 30, a turning device 40, a sensor group (51 to 55), and a control device (controller) 100.

The steering wheel 10 is an operation member that a driver of the vehicle uses for steering. The steering shaft 20 is coupled with the steering wheel 10 and rotates together with the steering wheel 10.

The reaction torque generation device 30 applies a reaction torque TR to the steering wheel 10 in a pseudo manner. More specifically, the reaction torque generation device 30 includes a reaction torque motor 31 (reaction torque actuator). A rotor of the reaction torque motor 31 is connected to the steering shaft 20 through a speed reducer 32. Actuating the reaction torque motor 31 makes it possible to apply the reaction torque TR to the steering shaft 20 and thus to the steering wheel 10. An operation of the reaction torque generation device 30 is controlled by the control device 100.

The turning device 40 turns the wheel WH. Here, turning the wheel WH means changing a direction of the wheel WH for making a turn. More specifically, the turning device 40 includes a turning motor 41, a speed reducer 42, and a turning bar 43. A rotor or the turning motor 41 is connected to the turning bar 43 through the speed reducer 42. The turning bar 43 is coupled with the wheel WH. When the turning motor 41 rotates, its rotational motion is converted into a linear motion of the turning bar 43, and thereby the wheel WH turns (i.e. changes its direction). That is, actuating the turning motor 41 makes it possible to turn the wheel WH. An operation of the turning motor 41 is controlled by the control device 100.

It should be noted that the turning device 40 is mechanically separated from the steering wheel 10 and the reaction torque generation device 30 on the steering side.

A steering angle sensor 51 detects a steering angle θ of the steering wheel 10. The steering angle sensor 51 transmits information of the detected steering angle θ to the control device 100.

A steering torque sensor 52 detects a steering torque TS applied to the steering shaft 20. The steering torque sensor 52 transmits information of the detected steering torque TS to the control device 100.

A vehicle speed sensor 53 detects a vehicle speed V being a speed of the vehicle. The vehicle speed sensor 53 transmits information of the detected vehicle speed V to the control device 100.

A wheel speed sensor 54 is provided for each wheel WH and detects a wheel speed Vw of each wheel WH. The wheel speed sensor 54 transmits information of the detected wheel speed Vw to the control device 100.

A lateral G sensor 55 detects a lateral acceleration Gy. The lateral G sensor 55 transmits information of the detected lateral acceleration Gy to the control device 100.

The control device 100 (controller) controls the steer-by-wire system 1 according to the present embodiment. The control device 100 includes a microcomputer provided with a processor, a memory, and an input/output interface. The microcomputer is also called an ECU (Electronic Control Unit). Processing by the control device 100 is achieved by the processor executing a control program stored in the memory.

For example, the control device 100 controls turning of the wheel WH by controlling the operation of the turning motor 41 according to rotation (steering) of the steering wheel 10. For example, the control device 100 calculates a target turn angle δ based on the steering angle θ, the vehicle speed V, and so forth. Then, control device 100 controls the turning motor 41 such that a turn angle of the wheel WH becomes the target turn angle δ. More specifically, the control device 100 generates a current control signal for driving the turning motor 41, based on the target turn angle δ and a rotation angle of the turning motor 41. The turning motor 41 is driven according to the current control signal, and the wheel WH is turned by the rotation of the turning motor 41.

Moreover, the control device 100 controls the reaction torque TR applied to the steering wheel 10 by controlling the operation of the reaction torque motor 31 according to rotation (steering) of the steering wheel 10. For example, the control device 100 calculates a target reaction torque based on the steering angle θ, the vehicle speed V, and so forth. Then, the control device 100 controls the reaction torque motor 31 such that the target reaction torque is generated. More specifically, the control device 100 generates a current control signal for driving the reaction torque motor 31, based on the target reaction torque, a rotation angle of the reaction torque motor 31, the steering torque TS, and so forth. The reaction torque motor 31 is driven according to the current control signal, and thereby the reaction torque TR is generated.

It should be noted that the control device 100 may separately include a first control device for controlling the turning motor 41 and a second control device for controlling the reaction motor 31. In that case, the first control device and the second control device are communicably connected to each other and exchange necessary information with each other.

Hereinafter, turning control by the control device 100 according to the present embodiment will be described in more detail.

2. Turning Control

Figure 2:
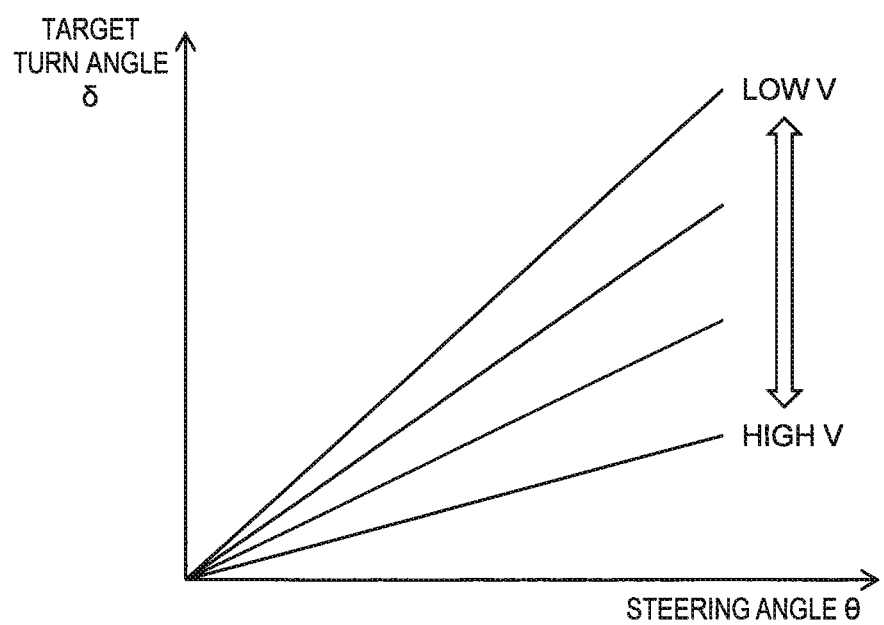
FIG. 2 is a conceptual diagram for explaining an outline of turning control.

FIG. 2 is a conceptual diagram for explaining an outline of the turning control by the control device 100. A horizontal axis represents the steering angle θ, and a vertical axis represents the target turn angle δ. The target turn angle δ is represented as a function F of the steering angle θ (i.e. δ=F(θ)). Basically, the target turn angle δ becomes larger as the steering angle θ becomes larger.

The function F between the steering angle θ and the target turn angle δ depends also on the vehicle speed V. The target turn angle δ becomes smaller as the vehicle speed V becomes higher, when compared at the same steering angle θ. It is thus possible to suppress destabilization of vehicle behavior in a state where the vehicle speed V is high. In other words, the target turn angle δ (i.e. the function F) is set so as to achieve stable vehicle behavior.

Figure 3:
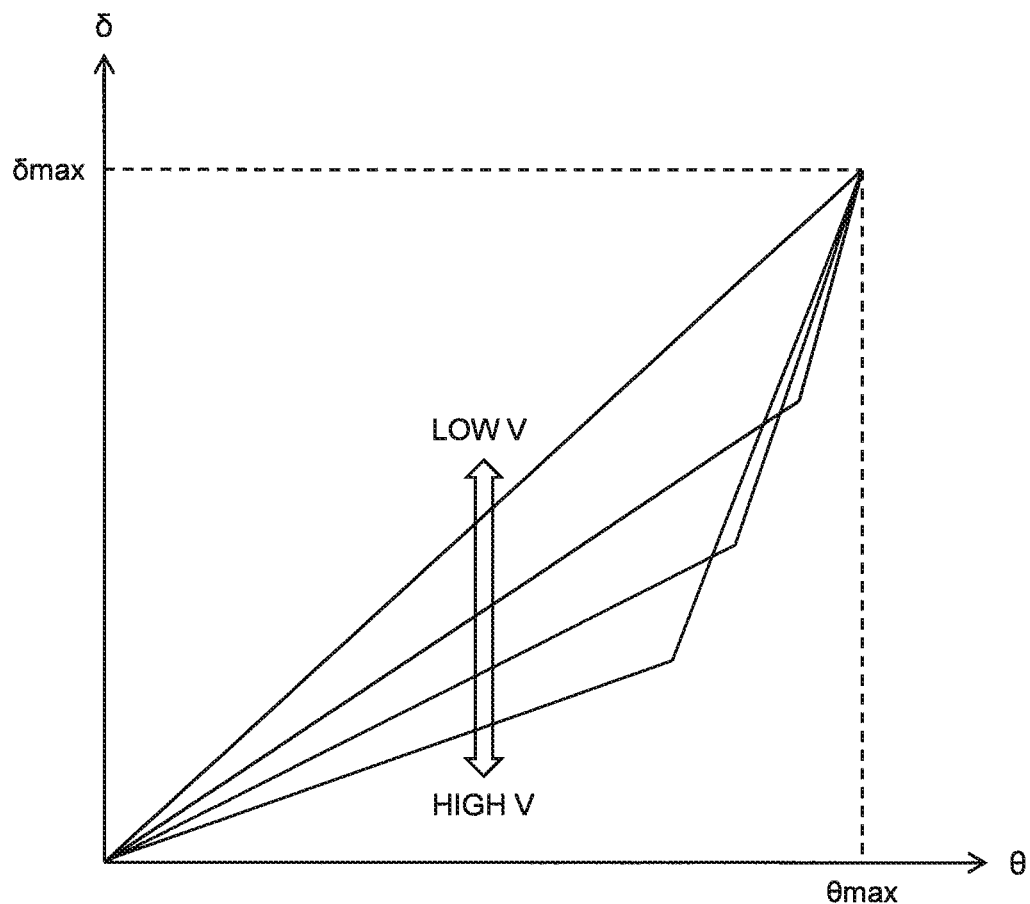
FIG. 3 is a conceptual diagram showing functions between a steering angle and a target turn angle according to the embodiment of the present disclosure.

In the example shown in FIG. 2, a maximum value of the target turn angle δ varies depending on the vehicle speed V. However, in some cases, it is required to "achieve a predetermined maximum turn angle δmax in a whole vehicle speed range". In other words, in some cases, the target turn angle δ is required to be the predetermined maximum turn angle δmax when the steering angle θ is a predetermined maximum steering angle θmax, regardless of the vehicle speed V. When there is such a constraint, the function F between the steering angle θ and the target turn angle δ is as shown in FIG. 3. In a steering range where the steering angle θ is relatively small, the function F is similar to that shown in FIG. 2. However, in a steering range where the steering angle θ is close to the maximum steering angle θmax, the target turn angle δ may increase sharply towards the predetermined maximum turn angle δmax.

Figure 4:
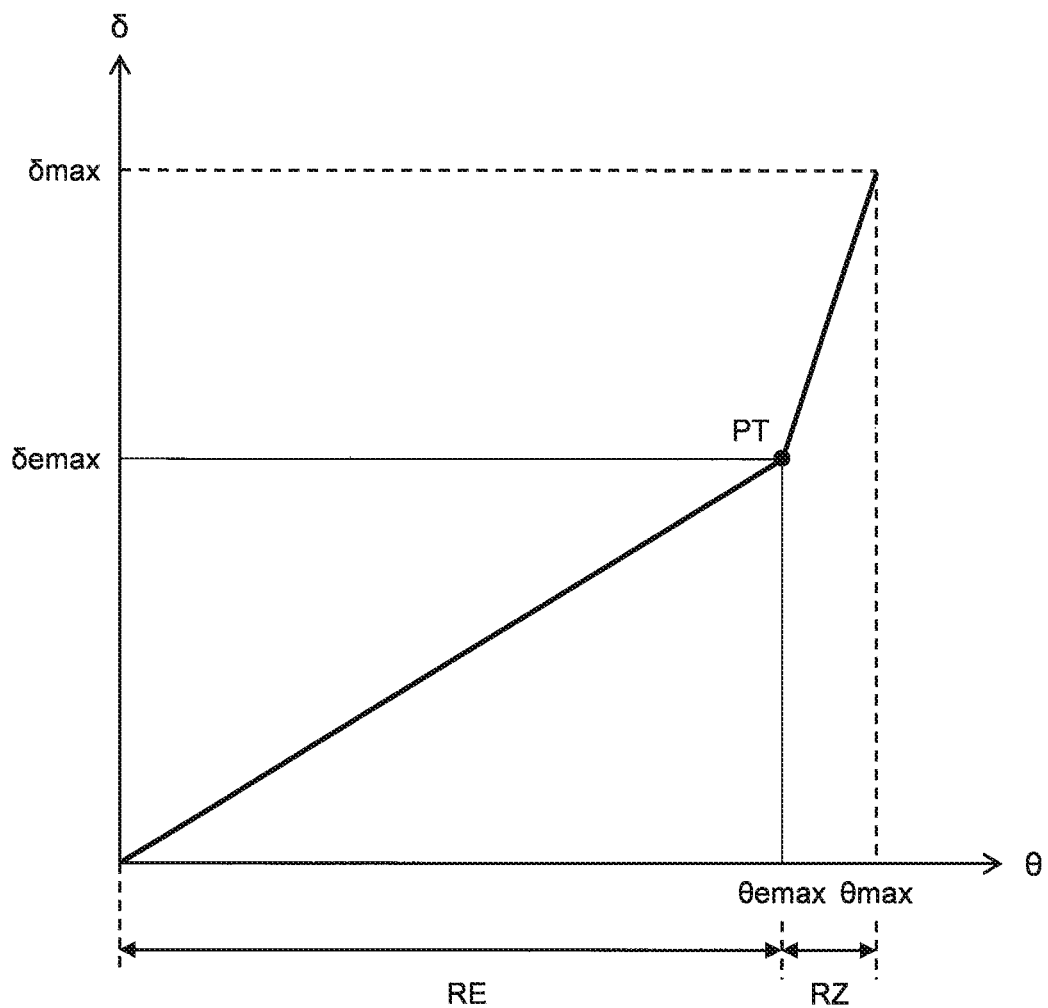
FIG. 4 is a conceptual diagram showing a function between the steering angle and the target turn angle according to the embodiment of the present disclosure.

FIG. 4 shows the function F between the steering angle θ and the target turn angle δ for a certain vehicle speed V. A maximum value of the steering angle θ is the predetermined maximum steering angle θmax. A maximum value of the target turn angle δ is the predetermined maximum turn angle δmax. The maximum turn angle δmax is constant regardless of the vehicle speed V. The function F is set such that the target turn angle δ calculated according to the maximum steering angle θmax is equal to the maximum turn angle δmax.

As shown in FIG. 4, a variation range of the steering angle θ (0 to θmax) includes an "effective steering range RE" and an "adjustment steering range RZ".

The effective steering range RE is a steering range where the target turn angle δ (i.e. the function F) is set so as to achieve stable vehicle behavior as in the case of FIG. 2 described above. More specifically, the effective steering range RE is a steering range in which the steering angle θ is equal to or smaller than an "effective maximum steering angle θemax". The effective maximum steering angle θemax is smaller than the predetermined maximum steering angle θmax. The target turn angle δ calculated according to the effective maximum steering angle θemax is an "effective maximum turn angle δemax". The effective maximum turn angle δemax is determined according to the vehicle speed V such that stable vehicle behavior can be achieved. More specifically, the effective maximum turn angle δemax decreases as the vehicle speed V becomes higher (see FIG. 3). The target turn angle δ calculated according to the effective maximum steering angle θemax is equal to the effective maximum turn angle δemax determined according to the vehicle speed V.

On the other hand, the adjustment steering range RZ is a steering range for achieving the predetermined maximum turn angle max that is required. More specifically, the adjustment steering range RZ is a steering range in which the steering angle θ is larger than the effective maximum steering angle θemax and equal to or smaller than the predetermined maximum steering angle θmax. The target turn angle δ calculated according to the predetermined maximum steering angle $\theta$max is equal to the predetermined maximum turn angle max that is required.

A transition point PT is a point defined by the effective maximum steering angle $\theta$emax and the effective maximum turn angle $\delta$emax. A slope of the function F, that is, a derivative of the target turn angle $\delta$ with respect to the steering angle $\theta$ changes at the transition point PT. Typically, the slope of the function F in the adjustment steering range RZ is higher than the slope of the function F in the effective steering range RE.

In a normal steering operation, the adjustment steering range RZ is not used. The control device 100 may control the reaction torque TR to make it harder to rotate the steering wheel 10 in the adjustment steering range RZ.

Figure 5:
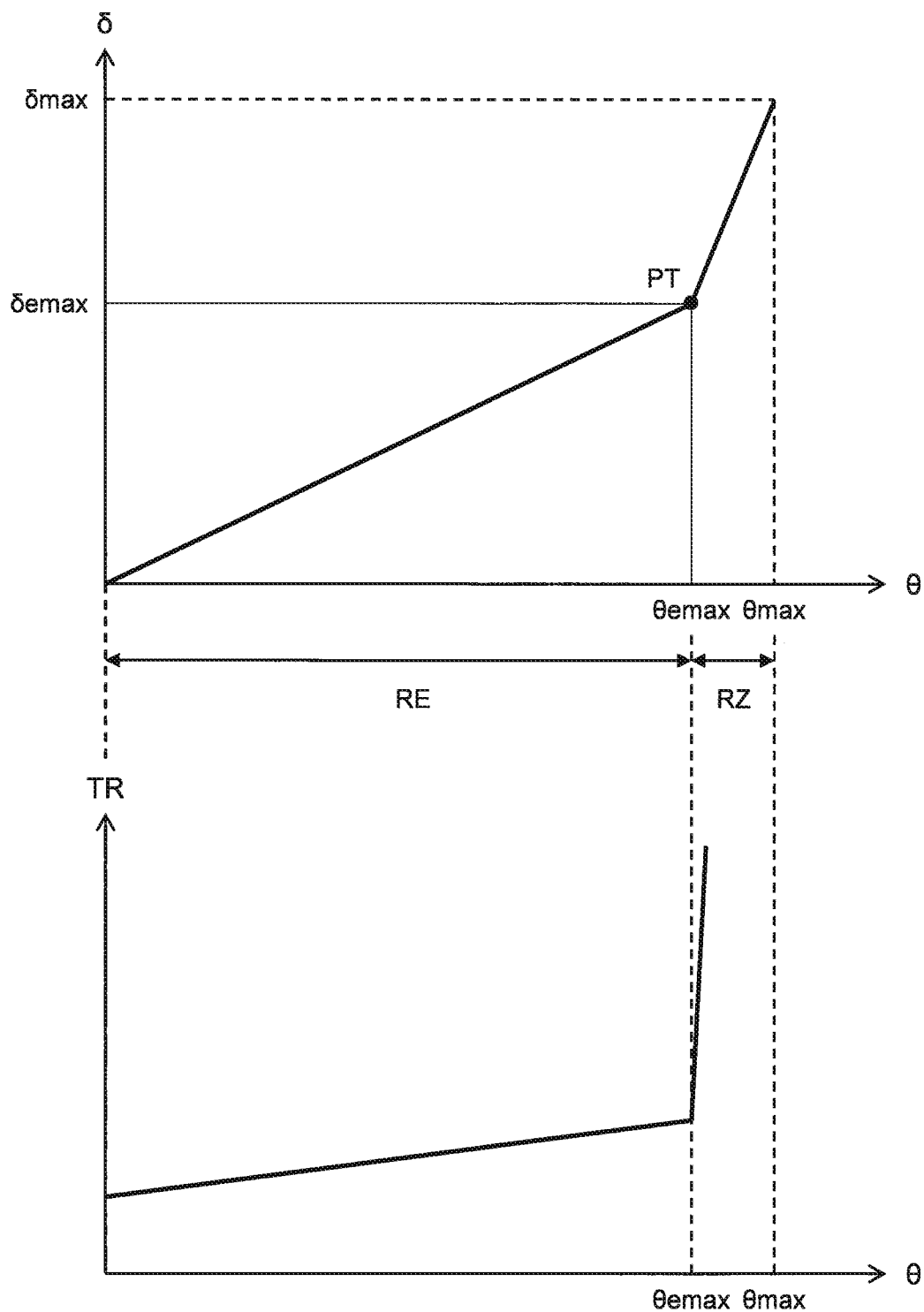
FIG. 5 is a conceptual diagram for explaining an example of reaction torque control according to the embodiment of the present disclosure.

FIG. 5 is a conceptual diagram for explaining an example of reaction torque control by the control device 100. The control device 100 increases the reaction torque TR greatly at the transition point PT. That is, the control device 100 makes the reaction torque TR in the adjustment steering range RZ much larger than the reaction torque TR in the effective steering range RE. The control device 100 may make a reaction torque slope (a derivative of the reaction torque TR with respect to the steering angle $\theta$) in the adjustment steering range RZ higher than the reaction torque slope in the effective steering range RE. Such reaction torque control makes it harder to rotate the steering wheel 10 in the adjustment steering range RZ. As a result, the vehicle behavior is prevented from unnecessarily being unstable.

Figure 6:
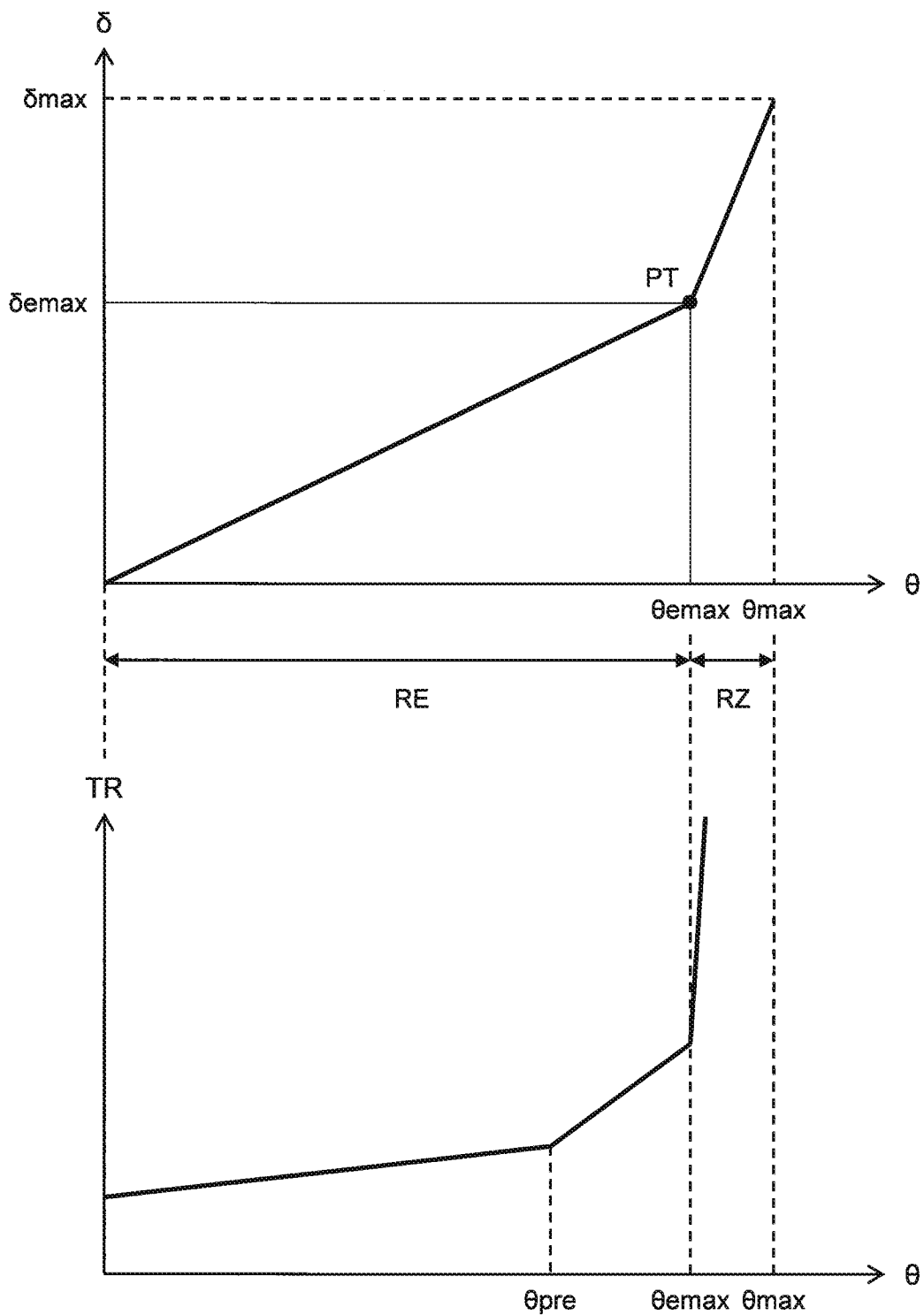
FIG. 6 is a conceptual diagram for explaining another example of the reaction torque control according to the embodiment of the present disclosure.

FIG. 6 is a conceptual diagram for explaining another example of the reaction torque control by the control device 100. If the steering wheel 10 suddenly becomes hard to rotate, the driver may feel senses of insecurity and strangeness. From this point of view, the control device 100 may gradually increase the reaction torque TR before the steering angle $\theta$ reaches the effective maximum steering angle $\theta$emax. More specifically, a precursor steering angle $\theta$pre is set to be smaller than the effective maximum steering angle $\theta$emax by a predetermined angle. The control device 100 makes the reaction torque slope (a derivative of the reaction torque TR with respect to the steering angle $\theta$) in a case where the steering angle $\theta$ is equal to or larger than the precursor steering angle $\theta$pre higher than the reaction torque slope in a case where the steering angle $\theta$ is smaller than the precursor steering angle $\theta$pre. Due to such preliminary increase control, the driver can beforehand know the sharp increase in the reaction torque TR. As a result, the driver's senses of insecurity and strangeness are reduced.

3. Turning Control Considering Road Surface Condition

Next, let us consider a road surface condition of a road surface on which the vehicle travels. In a low-$\mu$ condition where a road surface friction coefficient $\mu$ is low, the vehicle behavior is likely to be unstable. In particular, the vehicle behavior is likely to be unstable when the turn angle of the wheel WH becomes large in the low-$\mu$ condition.

In view of the above, the control device 100 according to the present embodiment takes the road surface condition into consideration to variably set the function F according to the road surface condition. More specifically, the control device 100 variably sets the effective maximum turn angle $\delta$emax according to the road surface condition.

Figure 7:
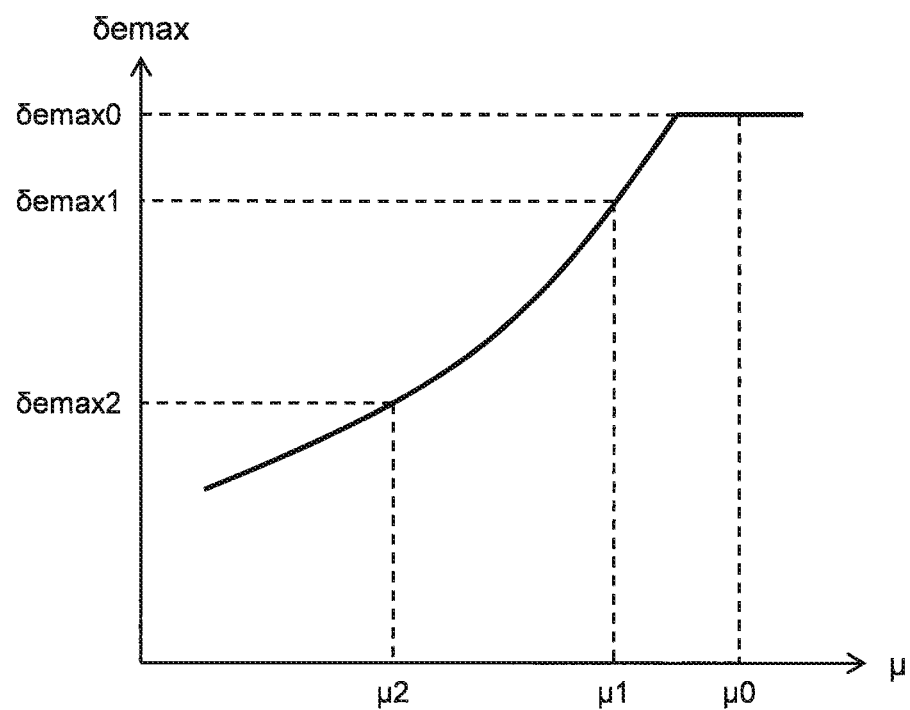
FIG. 7 is a conceptual diagram showing an example of a relationship between an effective maximum turn angle and a road surface condition according to the embodiment of the present disclosure.

FIG. 7 is a conceptual diagram showing an example of a relationship between the effective maximum turn angle $\delta$emax and the road surface condition. A horizontal axis represents the road surface friction coefficient $\mu$, and a vertical axis represents the effective maximum turn angle $\delta$emax. The relationship (function) as shown in FIG. 7 is set for each vehicle speed V. A standard maximum turn angle $\delta$emax0 is the effective maximum turn angle $\delta$emax shown in the foregoing FIG. 4, that is, the effective maximum turn angle $\delta$emax (a default value) when the road surface condition is not taken into consideration. The standard maximum turn angle $\delta$emax0 is determined according to the vehicle speed V.

The effective maximum turn angle $\delta$emax is set such that stable vehicle behavior is achieved at any road surface friction coefficient $\mu$ (i.e. the road surface condition). For example, when the road surface friction coefficient $\mu$ is a high value $\mu$0, the effective maximum turn angle $\delta$emax is the above-mentioned standard maximum turn angle $\delta$emax0. When the road surface friction coefficient $\mu$ is a first value $\mu$1 lower than the high value $\mu$0 ($\mu$1<$\mu$0), the effective maximum turn angle $\delta$emax is a first maximum turn angle $\delta$emax1 smaller than the standard maximum turn angle $\delta$emax0 ($\delta$emax1<$\delta$emax0). When the road surface friction coefficient $\mu$ is a second value $\mu$2 even lower than the first value $\mu$1 ($\mu$2<$\mu$1), the effective maximum turn angle $\delta$emax is a second maximum turn angle $\delta$emax2 even smaller than the first maximum turn angle $\delta$emax1 ($\delta$emax2<$\delta$emax1).

Figure 8:
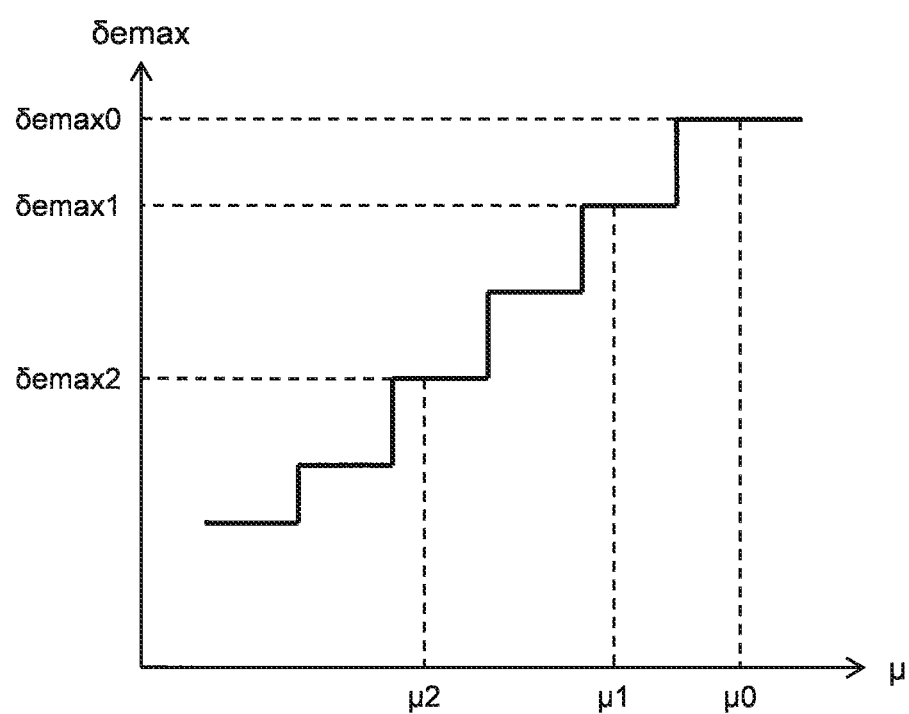
FIG. 8 is a conceptual diagram showing another example of the relationship between the effective maximum turn angle and the road surface condition according to the embodiment of the present disclosure.

As shown in FIG. 8, the effective maximum turn angle $\delta$emax may change in a stepwise manner.

According to the present embodiment, as described above, the control device 100 variably sets the function F between the steering angle $\theta$ and the target turn angle $\delta$ according to the road surface condition. More specifically, the control device 100 variably sets the function F according to the road surface condition such that the effective maximum turn angle $\delta$emax in a case of the low-$\mu$ condition is smaller than the effective maximum turn angle $\delta$emax in a case of the high-$\mu$ condition. Since the effective maximum turn angle $\delta$emax is decreased in the case of the low-$\mu$ condition, destabilization of vehicle behavior is suppressed in the case of the low-$\mu$ condition. This contributes to increase in confidence in the vehicle of the steer-by-wire type.

Various examples can be considered as a shape of the function F in the effective steering range RE when the road surface condition is taken into consideration. Hereinafter, various examples of the shape of the function F in the effective steering range RE will be described.

3-1. First Example

Figure 9:
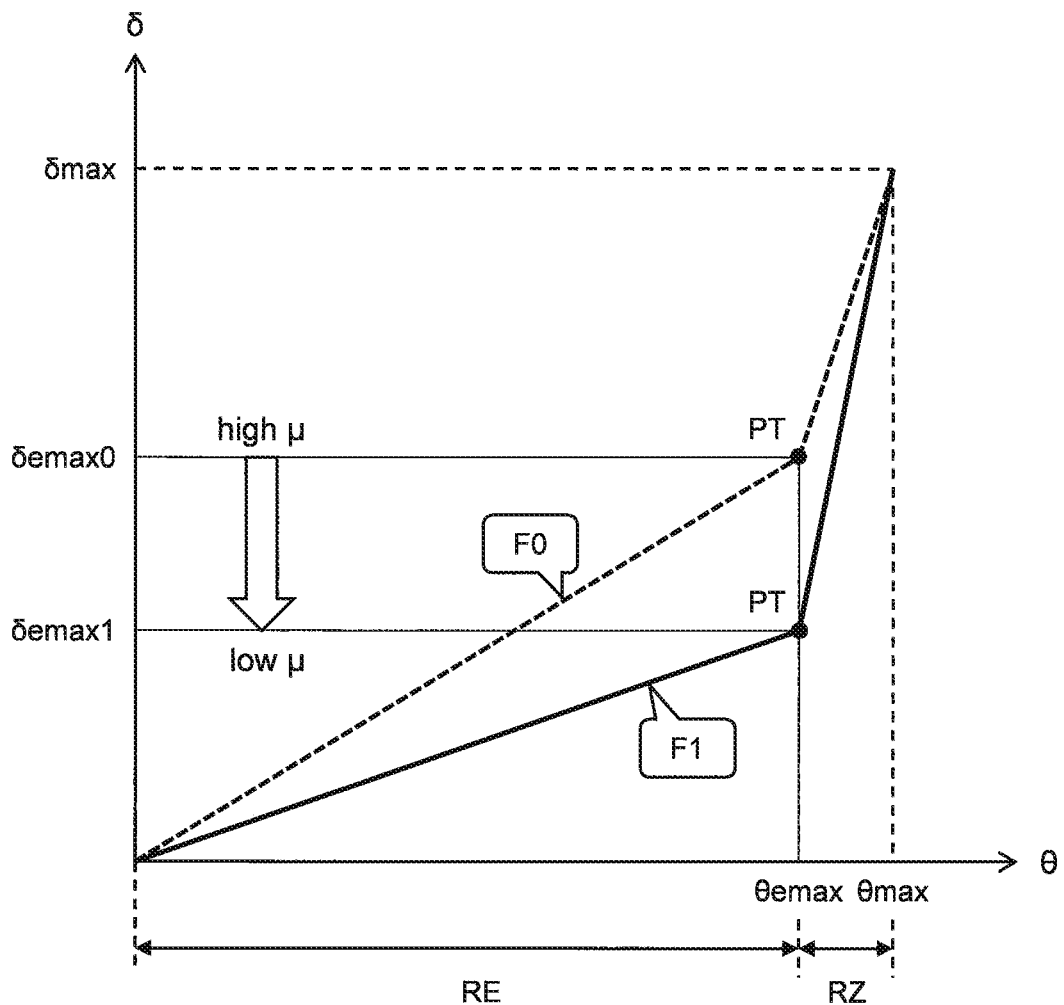
FIG. 9 is a conceptual diagram for explaining a first example of the function between the steering angle and the target turn angle according to the embodiment of the present disclosure.

FIG. 9 is a conceptual diagram for explaining a first example of the function F between the steering angle $\theta$ and the target turn angle $\delta$. A function F0 is the function F in the case of the high-$\mu$ condition. The target turn angle $\delta$ calculated by the function F0 according to the effective maximum steering angle $\theta$emax is the above-mentioned standard maximum turn angle $\delta$emax0. A function F1 is the function F in the case of the low-$\mu$ condition. The target turn angle $\delta$ calculated by the function F1 according to the effective maximum steering angle $\theta$emax is a first maximum turn angle $\delta$emax1 smaller than the standard maximum turn angle $\delta$emax0.

In the effective steering range RE, the target turn angle $\delta$ in the case of the low-$\mu$ condition is smaller than the target turn angle $\delta$ in the case of the high-$\mu$ condition. Moreover, in the effective steering range RE, the slope of the function F1 (a derivative of the target turn angle $\delta$ with respect to the steering angle $\theta$) in the case of the low-$\mu$ condition is lower than the slope of the function F0 in the case of the high-$\mu$ condition. As a result, destabilization of vehicle behavior is suppressed in the case of the low-μ condition.

3-2. Second Example

Figure 10:
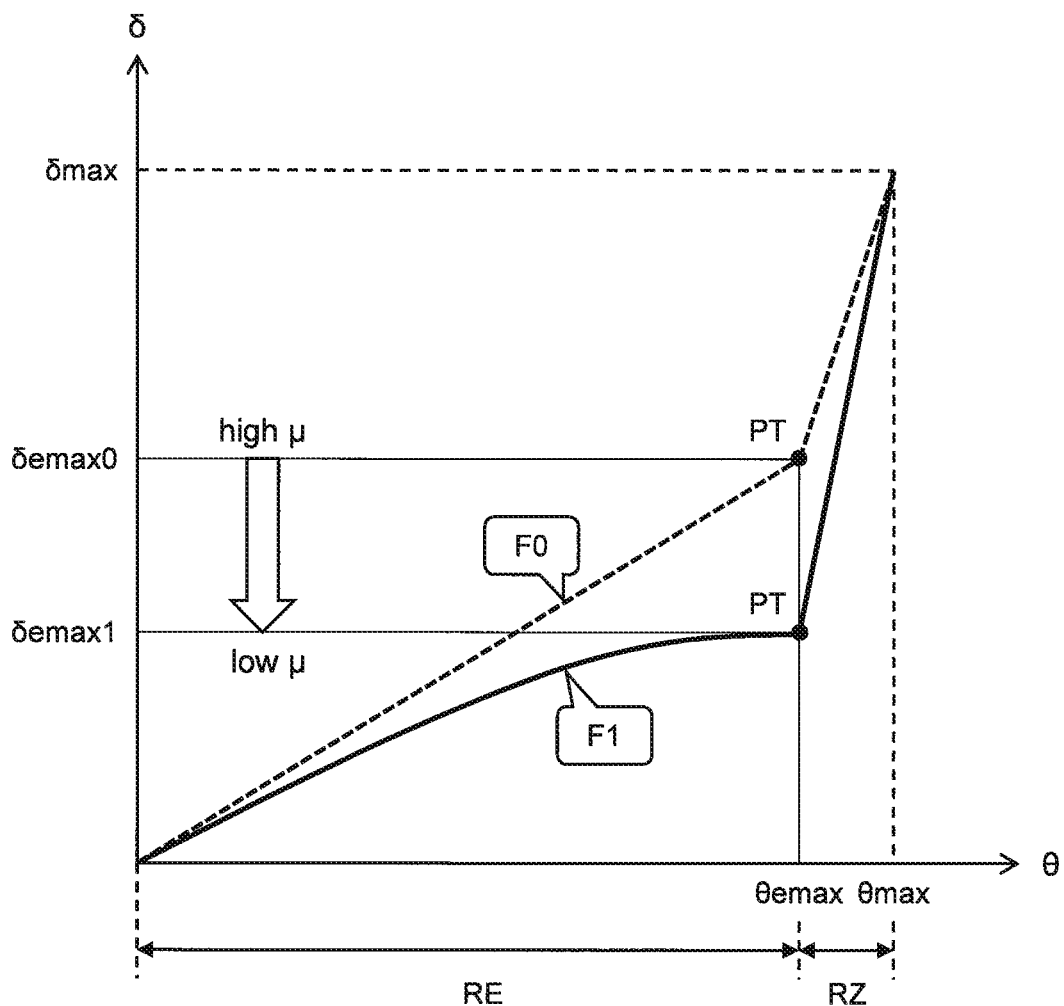
FIG. 10 is a conceptual diagram for explaining a second example of the function between the steering angle and the target turn angle according to the embodiment of the present disclosure.

FIG. 10 is a conceptual diagram for explaining a second example of the function F between the steering angle θ and the target turn angle δ. As shown in FIG. 10, the slope of the function F1 in the case of the low-μ condition may vary smoothly in the effective steering range RE. The others are the same as in the case of the first example. The same effects as in the case of the first example can be obtained by the second example.

3-3. Third Example

Figure 11:
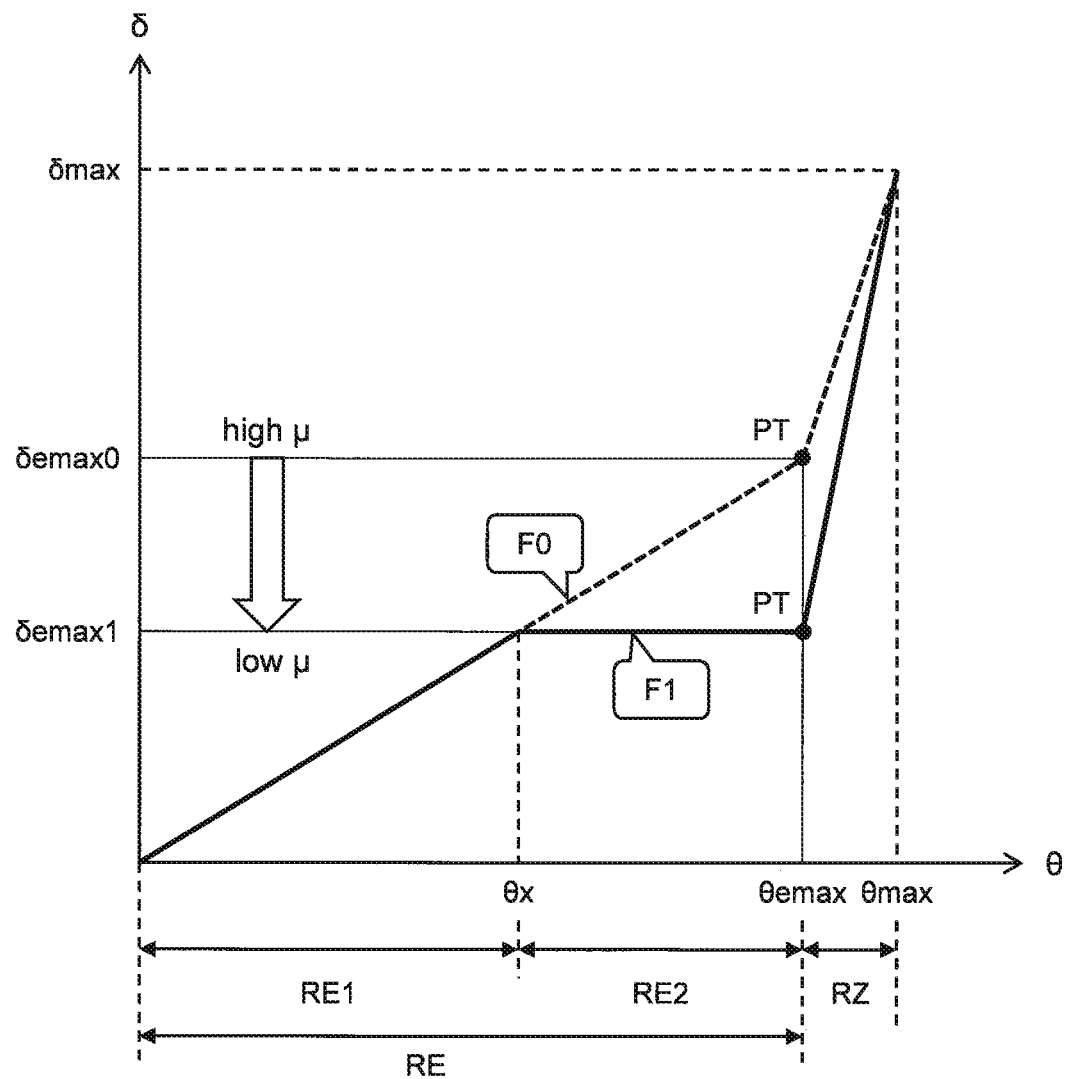
FIG. 11 is a conceptual diagram for explaining a third example of the function between the steering angle and the target turn angle according to the embodiment of the present disclosure.

FIG. 11 is a conceptual diagram for explaining a third example of the function F between the steering angle θ and the target turn angle δ. The effective steering range RE includes a first steering range RE1 and a second steering range RE2. The first steering range RE1 is a steering range in which the steering angle θ is smaller than a first steering angle θx. The second steering range RE2 is a steering range in which the steering angle θ is equal to or larger than the first steering angle θx and equal to or smaller than the effective maximum steering angle θemax. The target turn angle δ calculated by the function F1 according to the first steering angle θx is the first maximum turn angle δemax1.

In the first steering range RE1, the target turn angle δ in the case of the low-μ condition is equal to the target turn angle δ in the case of the high-μ condition. Therefore, the slope of the function F1 in the case of the low-μ condition also is equal to the slope of the function F0 in the case of the high-μ condition.

On the other hand, in the second steering range RE2, the target turn angle δ in the case of the low-μ condition is maintained at the first maximum turn angle δemax1. That is, the target turn angle δ does not change even when the steering angle θ is increased. The control device 100 may control the reaction torque TR to make it harder to rotate the steering wheel 10 in the second steering range RE2.

Figure 12:
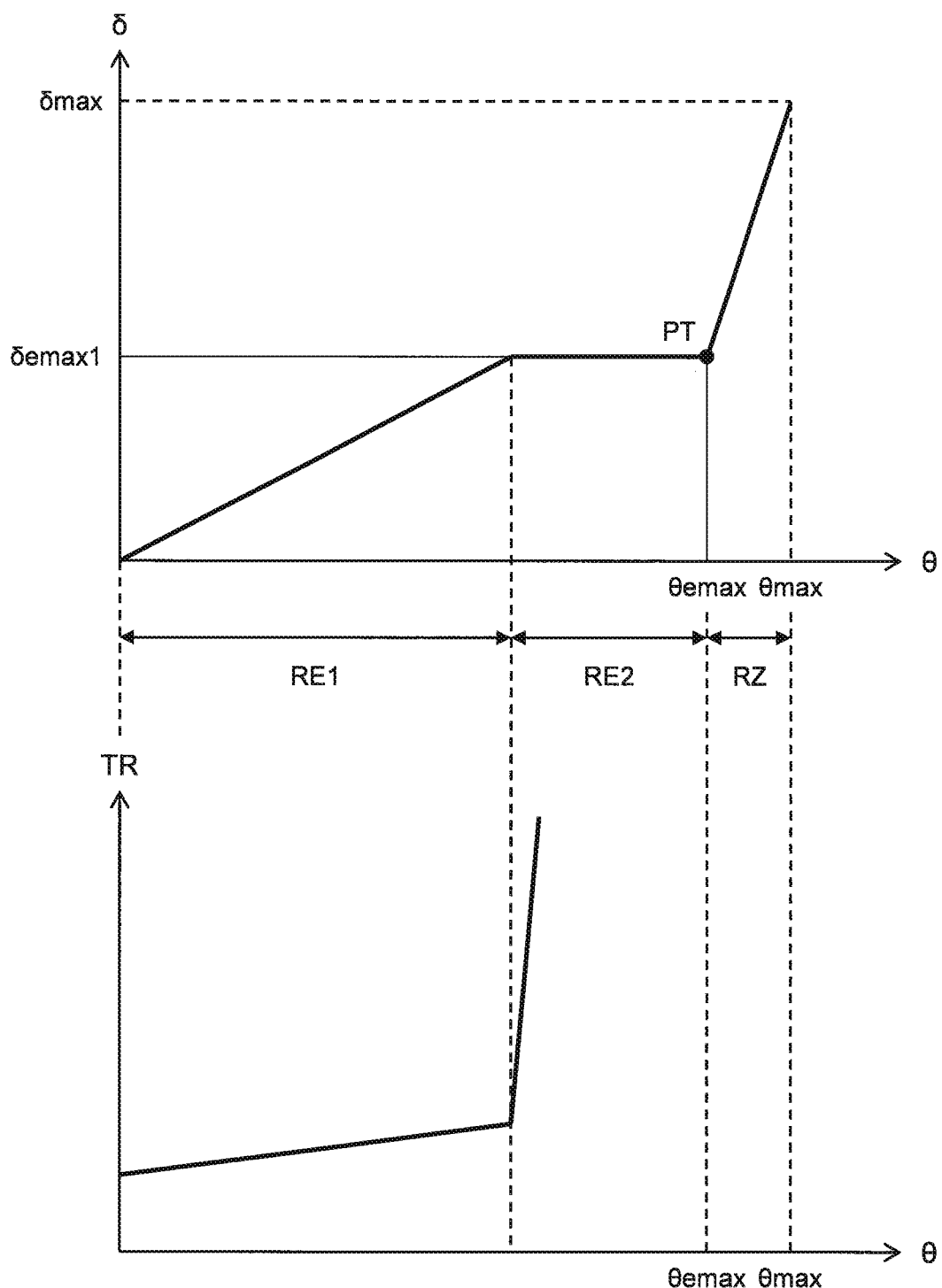
FIG. 12 is a conceptual diagram for explaining yet another example of the reaction torque control according to the embodiment of the present disclosure.

FIG. 12 is a conceptual diagram for explaining an example of the reaction torque control by the control device 100. The control device 100 makes the reaction torque TR in the second steering range RE2 much larger than the reaction torque TR in the first steering range RE1. The control device 100 may make the reaction torque slope (a derivative of the reaction torque TR with respect to the steering angle θ) in the second steering range RE2 higher than the reaction torque slope in the first steering range RE1. Such the reaction torque control makes it harder to rotate the steering wheel 10 in the second steering range RE2. As a result, the steering wheel 10 is prevented from unnecessarily rotating.

The third example also can suppress destabilization of vehicle behavior in the case of the low-μ condition.

3-4. Fourth Example

Figure 13:
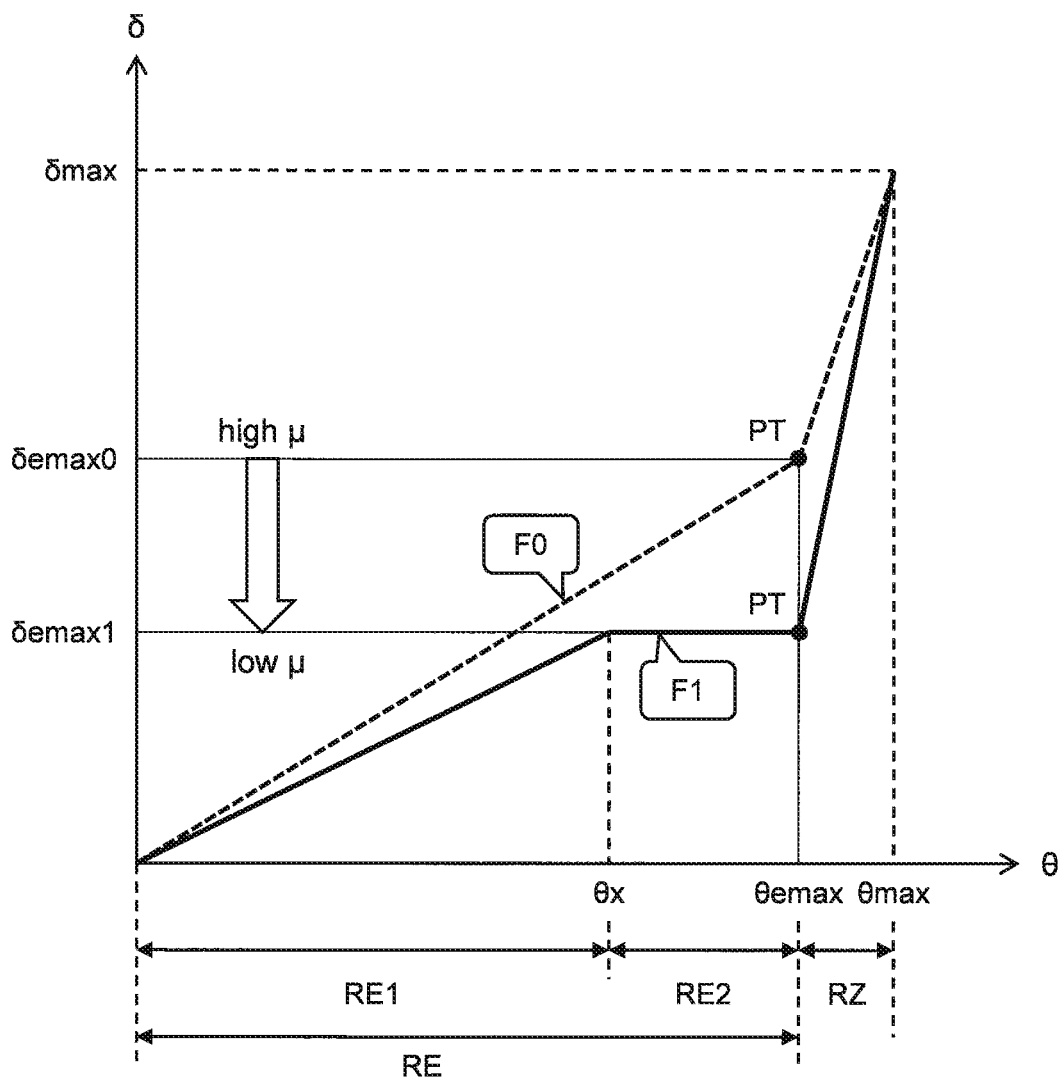
FIG. 13 is a conceptual diagram for explaining a fourth example of the function between the steering angle and the target turn angle according to the embodiment of the present disclosure.

FIG. 13 is a conceptual diagram for explaining a fourth example of the function F between the steering angle θ and the target turn angle δ. An overlapping description with the third example will be omitted as appropriate.

In the first steering range RE1, the target turn angle δ in the case of the low-μ condition is smaller than the target turn angle δ in the case of the high-μ condition. Moreover, in the first steering range RE1, the slope of the function F1 in the case of the low-μ condition is lower than the slope of the function F0 in the case of the high-μ condition.

On the other hand, in the second steering range RE2, the target turn angle δ in the case of the low-μ condition is maintained at the first maximum turn angle δemax1. That is, the target turn angle δ does not change even when the steering angle θ is increased. The control device 100 may execute the reaction torque control as shown in FIG. 12.

4. Process Flow by Steer-by-Wire System

Figure 14:
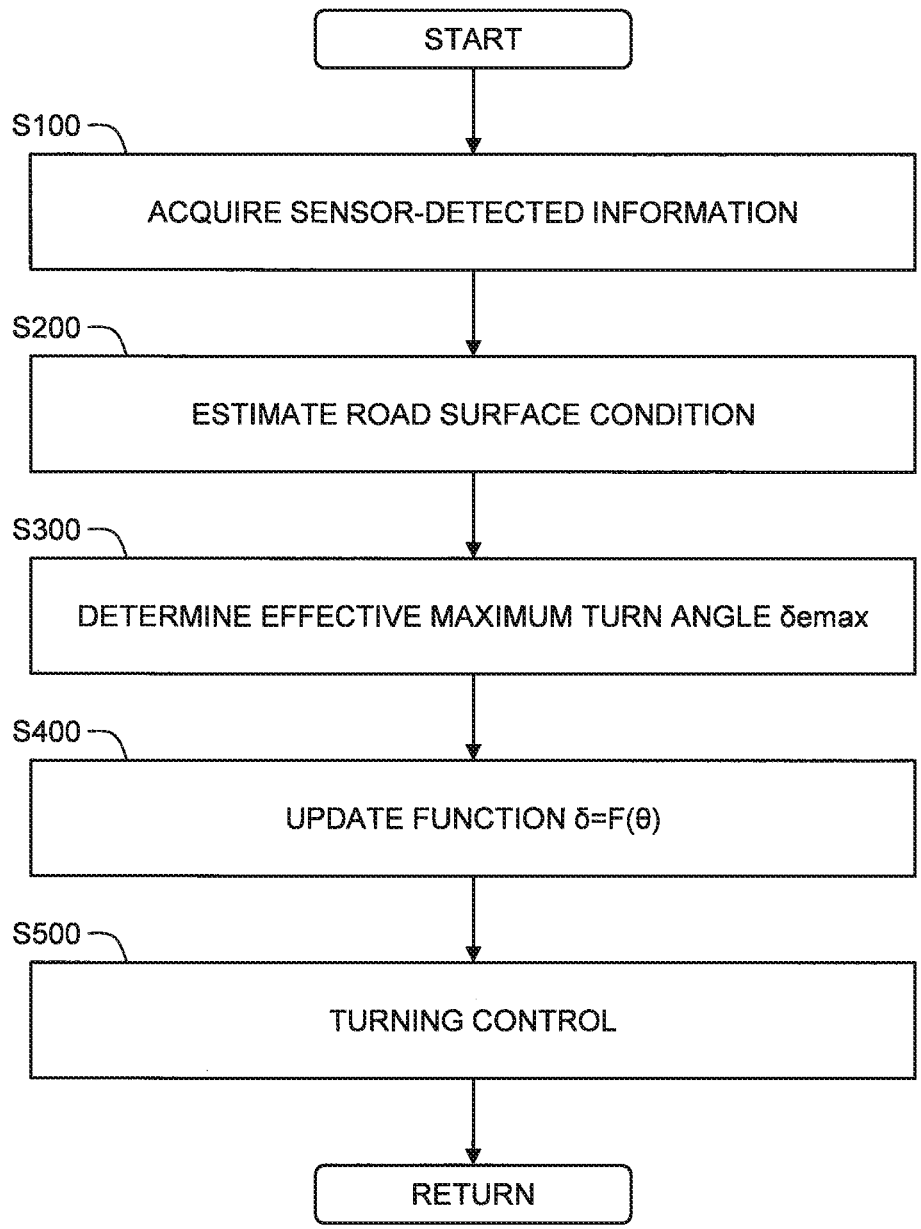
FIG. 14 is a flow chart showing an outline of processing by the steer-by-wire system according to the embodiment of the present disclosure.

FIG. 14 is a flow chart showing an outline of the processing by the steer-by-wire system 1 according to the present embodiment. The processing flow shown in FIG. 14 is repeatedly executed every certain cycle.

4-1. Step S100

The control device 100 (i.e. the processor) receives sensor-detected information from the sensor group 51 to 55. The sensor-detected information is stored in the memory of the control device 100.

4-2. Step S200

The control device 100 (i.e. the processor) estimates the road surface condition of the road surface on which the vehicle travels.

For example, the control device 100 estimates the road surface condition based on a slip ratio of a tire and a vehicle acceleration. In a region where the slip ratio is not so high, the vehicle acceleration is almost proportional to the slip ratio. A slope of the vehicle acceleration with respect to the slip ratio is hereinafter referred to as a "tire coefficient". The tire coefficient varies depending on the road surface condition. More specifically, the tire coefficient in the case of the low-μ condition is smaller than the tire coefficient in the case of the high-μ condition. Therefore, it is possible to estimate the road surface condition based on the tire coefficient. The slip ratio is calculated from the wheel speed Vw and the vehicle speed V. The wheel speed Vw is detected by the wheel speed sensor 54. The vehicle speed V is detected by the vehicle speed sensor 53, or calculated from the wheel speed Vw of each wheel. The vehicle acceleration is calculated from the vehicle speed V.

As another example, the control device 100 may estimate the road surface condition by a method disclosed in Patent Literature 2 (Japanese Unexamined Patent Application Publication No. JP-2010-188883). According to the method, the road surface condition is estimated based on a target yaw rate, the vehicle speed V, and the lateral acceleration Gy. The target yaw rate is calculated based on the steering angle θ and the vehicle speed V. The lateral acceleration Gy is detected by the lateral G sensor 55.

4-3. Step S300

The control device 100 (i.e. the processor) determines the effective maximum turn angle δemax based on the vehicle speed V and the road surface condition. More specifically, the control device 100 decreases the effective maximum turn angle δemax as the vehicle speed V becomes higher. In addition, the control device 100 decreases the effective maximum turn angle δemax in the case of the low-μ condition as compared with the effective maximum turn angle δemax in the case of the high-μ condition (see FIGS. 7 and 8). For example, a map for calculating the effective maximum turn angle δemax is created for each vehicle speed V and beforehand stored in the memory of the control device

100. The control device 100 uses the map to calculate the effective maximum turn angle δemax according to the vehicle speed V and the road surface condition.

4-4. Step S400

The control device 100 (i.e. the processor) updates the function F between the steering angle θ and the target turn angle δ based on the effective maximum turn angle δemax determined in Step S300. For example, a default map indicating the function F0 for calculating the target turn angle δ is created for each vehicle speed V and beforehand stored in the memory of the control device 100. Based on the standard maximum turn angle δemax0 and the effective maximum turn angle δemax, the control device 100 generates a map suitable for the current road surface condition from the default map (see FIGS. 9 to 11, and 13).

4-5. Step S500

The control device 100 (i.e. the processor) executes the turning control. More specifically, the control device 100 uses the function F to calculate the target turn angle δ according to the steering angle θ. Then, the control device 100 controls the turning motor 41 such that the turn angle of the wheel WH becomes the target turn angle δ. Moreover, the control device 100 executes the reaction torque control as shown in FIG. 5 or FIG. 6. The control device 100 may execute the reaction torque control as shown in FIG. 12.

What is claimed is:

1. A control device for a vehicle of a steer-by-wire type, wherein the vehicle comprises a steering wheel and a turning device configured to turn a wheel,
    the control device being configured to:
        calculate a target turn angle being represented as a function of a steering angle of the steering wheel; and
        control the turning device such that a turn angle of the wheel becomes the target turn angle, wherein
    a variation range of the steering angle includes:
        an effective steering range in which the steering angle is equal to or smaller than an effective maximum steering angle; and
        an adjustment steering range in which the steering angle is larger than the effective maximum steering angle and equal to or smaller than a predetermined maximum steering angle,
    the target turn angle calculated according to the predetermined maximum steering angle is equal to a predetermined maximum turn angle,
    the target turn angle calculated according to the effective maximum steering angle is an effective maximum turn angle,
    a road surface condition of a road surface on which the vehicle travels includes a high-μ condition and a low-μ condition where a road surface friction coefficient is lower than that in the high-μ condition, and
    the control device is further configured to variably set the function according to the road surface condition such that the effective maximum turn angle in a case of the low-μ condition is smaller than the effective maximum turn angle in a case of the high-μ condition.

2. The control device according to claim 1, wherein
    a slope of the function is a derivative of the target turn angle with respect to the steering angle, and
    the slope in the adjustment steering range is higher than the slope in the effective steering range.

3. The control device according to claim 1, wherein
    the vehicle further comprises a reaction torque generation device configured to apply a reaction torque to the steering wheel, and
    the control device is further configured to:
        control the reaction torque generation device such that the reaction torque according to the steering angle is applied to the steering wheel; and
        make the reaction torque in the adjustment steering range larger than the reaction torque in the effective steering range.

4. The control device according to claim 3, wherein
    a precursor steering angle is the steering angle smaller than the effective maximum steering angle,
    a reaction torque slope is a derivative of the reaction torque with respect to the steering angle, and
    the control device is further configured to make the reaction torque slope in a case where the steering angle is equal to or larger than the precursor steering angle higher than the reaction torque slope in a case where the steering angle is smaller than the precursor steering angle.

5. The control device according to claim 1, wherein
    the control device is further configured to decrease the effective maximum turn angle as a speed of the vehicle becomes higher.

6. The control device according to claim 1, wherein
    in the effective steering range, the target turn angle in the case of the low-μ condition is equal to or smaller than the target turn angle in the case of the high-μ condition.

7. The control device according to claim 6, wherein
    a slope of the function is a derivative of the target turn angle with respect to the steering angle, and
    in the effective steering range, the slope in the case of the low-μ condition is equal to or lower than the slope in the case of the high-μ condition.

8. The control device according to claim 7, wherein
    the effective steering range includes:
        a first steering range in which the steering angle is smaller than a first steering angle; and
        a second steering range in which the steering angle is equal to or larger than the first steering angle and equal to or smaller than the effective maximum steering angle,
    in the first steering range, the slope in the case of the low-μ condition is equal to or lower than the slope in the case of the high-μ condition, and
    in the second steering range, the target turn angle in the case of the low-μ condition is equal to the effective maximum turn angle.

9. The control device according to claim 8, wherein
    the vehicle further comprises a reaction torque generation device configured to apply a reaction torque to the steering wheel, and
    the control device is further configured to:
        control the reaction torque generation device such that the reaction torque according to the steering angle is applied to the steering wheel; and
        make the reaction torque in the second steering range larger than the reaction torque in the first steering range.

* * * * *